Patented May 12, 1953

2,638,415

UNITED STATES PATENT OFFICE 2,638,415

PRODUCTION OF CELLULOSE

John Edward Jones and Reginald Richard Stott, Spondon, near Derby, England, assignors to Celanese Corporation of America, a corporation of Delaware No Drawing. Application December 27, 1948, Serial No. 67,546. In Great Britain January 14, 1948

9 Claims. (Cl. 92—11)

This invention relates to the production of cellulose from ligno-cellulosic materials, for example from wood and especially from straw.

It is an object of the invention to prepare from ligno-cellulosic materials cellulose having a low pentosan content and suitable for conversion into cellulose esters and ethers, especially cellulose acetate.

We have found that the pentosan content of cellulosic material can be reduced by a process which comprises the steps of impregnating the material with a dilute aqueous caustic alkali solution, lowering the temperature of the impregnated material to a level at which all the water contained therein is frozen and, after a period of standing, raising the temperature at least sufficiently to melt all the ice formed. The term "cellulosic material" is employed in the present specification and claims to denote a raw ligno-cellulosic material or a product derived therefrom by a chemical pulping process or resulting from a chemical pretreatment or a purification operation employed in connection with such a pulping process. Thus the process of the invention may be carried out before a pulping operation, which may for instance be a sulphite, soda or sulphate cook, a chlorination, or a process comprising a nitric acid treatment followed by a treatment with caustic alkali, or it may follow a pulping operation, when it may be regarded as forming part of a purification treatment. In general, the new process is of greatest value when applied as part of a purification treatment, as is more fully described below; its use before pulping is, however, also of importance, especially in connection with the pulping of straw and other annual vegetable material.

The combined freezing and melting operation of the invention will, for the sake of brevity, be referred to as an "alkali freeze." It is preferably carried out by immersing the cellulosic material in the caustic alkali solution and then cooling the solution until it has all frozen. The frozen mass may then be allowed to stand, preferably for more than 1 hour and especially between about 2 and 5 hours, and may then be heated or allowed to take up heat from its surroundings until the frozen solution has melted. Other methods of impregnating and freezing may, however, be adopted if desired.

The solution now contains a substantial proportion of pentosans removed from the cellulosic material, and it is preferable to remove from the material the greater part or substantially all of the solution before giving the material any further desired treatment. For example the material may be pressed until it contains about 1.5–4 times its dry weight of the solution, or the solution may be filtered off and the residue washed, e. g. with water alone or with fresh caustic alkali solution followed if desired with water.

The concentration of the caustic alkali used in the alkali freeze may be quite low, for instance between about 2% and 5%, and is preferably between about 3% and 5%, excellent results being obtained using a 4% solution. In carrying out the alkali freeze the cellulosic material may, for example, be immersed in about 10–20 times its dry weight of the alkali solution and the mixture so obtained then frozen. Instead of simply being immersed, the material may be mechanically mixed or pulped with the caustic alkali solution, for instance in a Werner-Pfleiderer mixer or in some other mixing, pulping or shredding device. When the cellulosic material has been thoroughly mixed and impregnated with the solution, the mixture may be cooled sufficiently to cause the whole of the solution to freeze reasonably quickly. Advantageously the mixture may be cooled to a temperature between about $-4°$ C. and $-6°$ C.; the rate of cooling may be increased by stirring or otherwise agitating the solution until freezing has proceeded so far as to make further agitation impossible. The time required to freeze the solution can also be reduced by adding the cellulosic material to a caustic alkali solution which is already at a low temperature, e. g. about $0°–5°$ C.

It is preferred to follow the alkali freeze by a boil with a dilute caustic alkali solution whereby the pentosan content of the cellulosic material is still further reduced. Indeed the alkali freeze and subsequent alkali boil appear to co-act to such an extent that they may be regarded as comprising a unitary process, since the decrease in pentosan content resulting from the combination of the two operations is greater than the sum of the decreases effected by either in the absence of the other. It is possible to carry out the alkali boil with all the alkali solution used in the alkali freeze, that is without removing any of the solution by pressing, filtration or any other means, but the pentosan content of the product is then higher.

In one method of working in accordance with the invention a chemical pulp is subjected to the alkali freeze, preferably followed by an alkali boil. Either a wood pulp, e. g. a spruce, beech or poplar pulp, or a pulp derived from an annual vegetable material such as a cereal straw or bamboo, may be employed, and the product may have been made by a sulphite, soda, sulphate, chlorination, nitric acid or other type of pulping operation. It is preferable that the pulp should have a fairly high degree of purity before being subjected to the alkali freeze; thus it may have an alpha-cellulose content above 88% and advantageously above 90% and a pentosan content below 5% and, especially in the case of wood pulps, preferably below 3%; for example it may have been subjected to one or more purifying operations, e. g. with a bleaching agent or an alkaline solution, to bring the alpha-cellulose and the pentosan contents within the specified limits. Moreover the initial ligno-cellulosic material may have been given a preliminary treatment, e. g. a prehydrolysis with boiling water under pressure or with a very dilute acid solution, especially a 0.5%–2% aqueous solution of a strong mineral acid, before being subjected to the main pulping operation.

The alkali boil following the alkali freeze is preferably carried out with a caustic alkali solution of concentration below 5%, especially about 0.5%–3.5%, under atmospheric pressure. (In all cases when calculating the concentration of the caustic alkali solution, the alkali and water retained in the pulp after the alkali freeze must be taken into consideration.) A pressure boil can, if desired, be used, but the risk of degradation of the cellulose is then greater, and any increase in the power of the solution to attack and dissolve pentosans due to the higher temperature is not in general sufficient to outweigh the risk of attack of the cellulose and the disadvantage that more expensive plant is required when working under pressure. The material can, if desired, be treated with the alkali solution at a temperature somewhat below its boiling point, e. g. about 80°–95° C., but the treatment then needs to be longer and the pentosan content of the product will as a rule be higher than when the alkali solution is at its boiling point.

The alkali boil may, if desired, be followed by other purification operations, for instance one or more further treatments with a hot, dilute alkali solution and/or one or more treatments with other agents such as cold, more concentrated alkali solutions (e. g. solutions having mercerising properties) or bleaching agents, for instance chlorine water, hypochlorites in acid or alkaline solution, or sodium chlorite. Moreover the pulp may, if desired, be bleached between the alkali freeze and the subsequent alkali boil, e. g. with an alkaline hypochlorite solution in which the alkali may be supplied by that remaining in the pulp from the alkali freeze.

In another method of applying the invention which is particularly suited to the production of cellulose from annual vegetable materials such as straw, an alkali freeze may precede the main pulping operation. When the alkali freeze is carried out before a sulphite cook, it is advantageous to follow it with an alkali boil, preferably under atmospheric pressure as described in connection with the treatment of pulp; when the main pulping treatment is carried out with an alkaline solution as in the soda and sulphate processes and modifications thereof, this can replace the alkali boil that in other cases preferably follows the alkali freeze. If the prehydrolysis step using water under pressure or a dilute acid is employed, this preferably precedes the alkali freeze. In one process for producing cellulose from straw which we have found to give a very useful product, the straw is given a prehydrolysis with a solution of sulphuric or hydrochloric acid of concentration between about 0.5% and 2%, followed by an open boil with a very dilute, e. g. 1%–2%, solution of caustic alkali; the straw is then subjected to the alkali freeze and subsequently boiled at 130°–150° C. with a 3%–5% caustic alkali solution under pressure. A purification treatment may follow comprising one or more bleaching operations and/or one or more treatments with hot, dilute or cold, more concentrated alkali solutions.

If desired, both the pulping and the subsequent purification treatment may include an alkali freeze. For example the cellulosic material may be subjected to the freeze before an alkaline pulping treatment or again before or as the last or an intermediate stage of a purification treatment.

The following examples illustrate the invention:

*Example 1*

A wood pulp having an alpha-cellulose content of 90.4% and a pentosan content of 2.4% was immersed in a 4% solution of caustic soda and the temperature of the mixture reduced to −5° C. The solution was well stirred until it froze. After the solution had been frozen for 3 hours the mixture was heated until it had regained the air temperature and was then pressed until the pulp retained about 3 times its dry weight of the caustic soda solution. The pulp was then given an open boil with a 3% caustic soda solution for 1 hour, and was washed and dried. The product had an alpha-cellulose content of 94.4% and a pentosan content of 0.94%.

The effects both of the freezing and of the subsequent alkali boil are shown by the following experiment: The same wood pulp was given precisely the same treatment except that the 4% caustic soda solution containing the wood pulp was cooled only to 0° C. for 2 hours (at which temperature the solution does not freeze) and the subsequent alkali boil was omitted. The product had an alpha-cellulose content of 93.2% and a pentosan content of 1.41%. At the same stage in the freezing process described above (i. e. before the alkali boil) the product had an alpha-cellulose content of 93.4% and a pentosan content of 1.02%. Thus the effect of the freeze is to reduce the pentosan content by some 27% of its value when the solution is not frozen. The reduction due to freezing and the subsequent alkali boil expressed on the same basis is about 33%.

*Example 2*

The procedure of Example 1 was followed except that, instead of being given an open boil with a 3% caustic soda solution, the pressed pulp was boiled with a 1% caustic soda solution obtained by adding the required amount of water to the pulp. As in Example 1, the boil was performed at atmospheric pressure and continued for 1 hour. The product had an alpha-cellulose content of 94.6% and a pentosan content of 0.86%.

In the processes of both these examples the concentration of the caustic soda solution used for the freezing operation could be reduced to 3% without greatly affecting the alpha-cellulose content and pentosan content of the product. If a 2% solution was used, however, the pentosan content was slightly higher, though still considerably lower than when the temperature of even a 4% solution was reduced only to 0° C. and no freezing occurred.

*Example 3*

Wheat straw was given a boil with a 1% sulphuric acid solution (prehydrolysis) and then, after being washed free from acid, it was boiled with a 1% caustic soda solution under atmospheric pressure. The straw was then filtered off and washed, and immersed in a 4% caustic soda solution which had previously been cooled to about 3° C. The solution containing the straw was now cooled to −5° C. and kept at this temperature for 3 hours. The temperature was then allowed to rise to that of the surroundings, and the straw filtered off from the alkali solution and washed. It was then given a pressure boil with a 4% caustic soda solution at 135°–140° C. for 4 hours. The product, after being washed free from alkali and dried, but before being given a purification treatment, had a pentosan content of only 1.36%. When the freezing step was omitted, the pentosan content at this stage was 5.5%–6.5%.

*Example 4*

Another sample of wheat straw was boiled for 4 hours with 10 times its weight of 1% sulphuric acid, and was then washed free from acid and boiled for 1 hour with 10 times its weight of 1% caustic soda solution. The product was boiled for 4 hours at 140° C. with 5 times the weight of the original dry straw of a 4% caustic soda solution, after which it was washed and bleached with hypochlorite in the presence of a little acid. It was then washed with cold, very dilute caustic soda solution and re-bleached with hypochlorite. The bleached product was immersed in 12 times its weight of a 4% caustic soda solution, which was then cooled to −5° C., being vigorously stirred as long as possible. It was kept at this temperature for 1 hour and was then allowed to warm up sufficiently to melt the frozen solution. The caustic soda solution was then filtered off and the residue washed with water until nearly free from caustic soda, after which it was boiled under atmospheric pressure for ½ hour with a 0.5% caustic soda solution. The product had a pentosan content of 1.59% and an alpha-cellulose content of 94.2%. If the process was modified by interchanging the alkali freeze and the bleaching operation, a very similar product was obtained.

The process of the invention can also be applied to native celluloses, i. e. naturally occurring, fairly pure forms of cellulose, and especially to cotton linters which are to be used for conversion into cellulose esters or ethers.

*Example 5*

Cotton linters were immersed in 8 times their weight of a 4% caustic soda solution, and the solution was then cooled to −5° C., stirring vigorously as long as possible. After 1 hour at this temperature the mixture was allowed to warm up sufficiently to melt the frozen solution, and the caustic soda solution was then filtered off. The residue was washed with water until nearly free from caustic soda, after which it was boiled under atmospheric pressure for ½ hour with a 0.5% caustic soda solution. The product was a substantially pure cellulose suitable for conversion to cellulose esters and ethers.

Cellulose of high alpha-cellulose content and low pentosan content obtained in accordance with the invention may be used in the manufacture of organic derivatives of cellulose, in particular cellulose esters of organic acids such, for instance, as cellulose acetate, cellulose propionate, cellulose butyrate, and mixed esters including mixed esters of lower and higher fatty acids, e. g. cellulose acetate stearate, and also of cellulose ethers, e. g. methyl cellulose, ethyl cellulose, benzyl cellulose, carboxymethyl cellulose, hydroxyethyl cellulose, hydroxyethyl methyl cellulose and hydroxyethyl ethyl cellulose. The cellulose esters or ethers can be used in the manufacture of textile and other shaped articles by wet and dry methods, and for the manufacture of lacquers and other coating compositions. Other uses to which the product of the invention may be put include the manufacture of viscose and cuprammonium solutions which are to be used for producing artificial textile or other shaped articles.

Having described our invention, what we desire to secure by Letters Patent is:

1. Process for the production of cellulose from raw ligno-cellulosic material, which comprises impregnating the material with a 2 to 5% aqueous solution of a caustic alkali, lowering the temperature of the impregnated material to a level at which all the water contained therein is frozen, keeping the impregnated material in this condition for 1 to 5 hours, raising the temperature so as to melt all the ice formed, removing at least the greater part of the alkali solution from the material and subjecting the material to a delignifying treatment.

2. Process for the production of cellulose from cereal straw, which comprises impregnating the straw with a 2 to 5% aqueous solution of a caustic alkali, lowering the temperature of the impregnated straw to a level at which all the water contained therein is frozen, keeping the impregnated straw in this condition for 1 to 5 hours, raising the temperature so as to melt all the ice formed, removing at least the greater part of the alkali solution from the straw and subjecting the straw to a delignifying treatment.

3. Process for the production of cellulose from cereal straw, which comprises impregnating the straw with a 4% aqueous solution of a caustic alkali, lowering the temperature of the impregnated straw to a level at which all the water contained therein is frozen, keeping the impregnated straw in this condition for 2 to 5 hours, raising the temperature so as to melt all the ice formed, removing at least the greater part of the alkali solution from the straw and subjecting the straw to a delignifying treatment.

4. Process for the production of cellulose from raw ligno-cellulosic material, which comprises impregnating the material with a 2 to 5% aqueous solution of a caustic alkali, lowering the temperature of the impregnated material to a level at which all the water contained therein is frozen, keeping the impregnated material in this condition for 1 to 5 hours, raising the temperature so as to melt all the ice formed, removing at least the greater part of the alkali solution from the material, giving the material a boil with a 0.5 to 3.5% aqueous solution of a caustic alkali and subjecting the material to delignification with an acid reagent.

5. Process for the production of cellulose from raw ligno-cellulosic material, which comprises impregnating the material with a 2 to 5% aqueous solution of a caustic alkali, lowering the temperature of the impregnated material to a level at which all the water contained therein is frozen, keeping the impregnated material in this condition for 1 to 5 hours, raising the temperature so as to melt all the ice formed, removing at least the greater part of the alkali solution from the material and subjecting the material to a delignifying treatment with an alkaline reagent.

6. Process for the production of cellulose from cereal straw, which comprises impregnating the straw with a 2 to 5% aqueous solution of a caustic alkali, lowering the temperature of the impregnated straw to a level at which all the water contained therein is frozen, keeping the impregnated straw in this condition for 1 to 5 hours, raising the temperature so as to melt all the ice formed, removing at least the greater part of the alkali solution from the straw, giving the straw a boil with a 0.5 to 3.5% aqueous solution of a caustic alkali and subjecting the straw to a delignification treatment of the sulphite type.

7. Process for the production of cellulose from cereal straw, which comprises impregnating the straw with a 2 to 5% aqueous solution of a caustic alkali, lowering the temperature of the impregnated straw to a level at which all the water contained therein is frozen, keeping the impregnated straw in this condition for 1 to 5 hours, raising the temperature so as to melt all the ice formed, removing at least the greater part of the alkali solution from the straw, and subjecting the straw to a delignification treatment of the soda type.

8. Process for the production of cellulose from cereal straw, which comprises impregnating the straw with a 2 to 5% aqueous solution of a caustic alkali, lowering the temperature of the impregnated straw to a level at which all the water contained therein is frozen, keeping the impregnated straw in this condition for 1 to 5 hours, raising the temperature so as to melt all the ice formed, removing at least the greater part of the alkali solution from the straw, and subjecting the straw to a delignification treatment of the sulphate type.

9. Process for the production of cellulose from cereal straw, which comprises boiling the straw first with a 0.5 to 2% aqueous solution of a strong mineral acid and then with a 1 to 2% aqueous solution of a caustic alkali, impregnating the straw with a 2 to 5% aqueous solution of a caustic alkali, lowering the temperature of the impregnated straw to a level at which all the water contained therein is frozen, keeping the impregnated straw in this condition for 2 to 5 hours, raising the temperature so as to melt all the ice formed, removing at least the greater part of the alkali solution from the straw and then boiling the straw under pressure at 130° to 150° C. with a 3 to 5% aqueous solution of a caustic alkali.

JOHN EDWARD JONES.
REGINALD RICHARD STOTT.

References Cited in the file of this patent

UNITED STATES PATENTS

| Number | Name | Date |
| --- | --- | --- |
| 1,602,253 | Runkel | Oct. 5, 1926 |
| 1,755,657 | Leuchs | Apr. 22, 1930 |
| 2,061,616 | Dreyfus | Nov. 24, 1936 |
| 2,138,283 | Richter | Nov. 29, 1938 |

FOREIGN PATENTS

| Number | Country | Date |
| --- | --- | --- |
| 267,226 | Great Britain | Mar. 14, 1927 |
| 301,088 | Great Britain | Mar. 24, 1930 |
| 317,046 | Great Britain | July 24, 1930 |

OTHER REFERENCES

Ott, "Cellulose and Cellulose Derivatives," 1943, pages 274–5.